United States Patent [19]

Blum et al.

[11] Patent Number: 5,362,753
[45] Date of Patent: Nov. 8, 1994

[54] METHOD OF INCREASING THE HATCHABILITY OF EGGS BY FEEDING HENS CARNITINE

[75] Inventors: Rene Blum, Rheinfelden, Switzerland; Josef Leibetseder, Vienna, Austria

[73] Assignee: Lonza Ltd., Basel, Switzerland

[21] Appl. No.: 49,258

[22] Filed: Apr. 19, 1993

[51] Int. Cl.$^5$ .......................................... A61K 31/205
[52] U.S. Cl. .................................................. 514/556
[58] Field of Search ........................................ 514/556

[56] References Cited

FOREIGN PATENT DOCUMENTS 0126420 8/1982 Japan.

OTHER PUBLICATIONS

Chang et al. *Poultry Sci* 54(5):1718–1720, 1975.
Waldroup et al. *Poultry Sci* 55(6):2342–2347, 1976.
Lee et al. *Korean J Anim Sci* 27(3):161–168, 1985. (Abstract Only).
Lee et al. *Korean J Anim Sci* 27(3):169–175, 1985. (Abstract Only).
Cartwright et al. *Poultry Sci* 65(Supp. 1):21, 1986.
Lilburn et al. *Poultry Sci* 69(7):1126–1132, 1990.
Sherman et al. *Poultry Sci* 71(Supp. 1):64, 1992.

*Primary Examiner*—Marianne M. Cintins
*Assistant Examiner*—K. Weddington
*Attorney, Agent, or Firm*—Darby & Darby

[57] ABSTRACT

The present invention relates to a method of feeding female birds with a feed formulation which enhances the hatchability of the eggs laid, as evidenced by an increase in hatching percentage. Poultry diets of this invention include an amount of a carnitine, such as L-carnitine or a L-carnitine salt. The amount present in the diet is such that the hatchability of eggs laid by hens fed this diet is increased.

5 Claims, No Drawings

METHOD OF INCREASING THE HATCHABILITY OF EGGS BY FEEDING HENS CARNITINE

FIELD OF THE INVENTION

The present invention is in the general field of poultry farming and relates to the feeding of fowl, including layers and broiler breeders. In a particular aspect, it relates to a method of feeding female birds with a feed formulation which enhances the hatchability of the eggs laid, as evidenced by an increase in hatching percentage. Poultry diets of this invention include an amount of a carnitine, such as L-carnitine or a L-carnitine salt. The amount present in the diet is such that the hatchability of eggs laid by hens fed this diet is increased.

BACKGROUND OF THE INVENTION

Previous studies have attempted to correlate hen production performance with diet. Lee et al. (*Korean J Anim Sci* 27(3):161–168 and 169–175, 1985) identify the energy and protein requirements of broiler breeder hens between 24 and 64 weeks of age. Although these optimum diets increased egg production at certain age stages, no increase in hatchability was seen with diets having optimum energy or protein levels. Similar studies by Lilburn et al. (*Poul Sci* 69(7):1126–1132, 1990) and Waldroup et al. (*Poul Sci* 55(6):2342–2347, 1976) also fail to report an effect of diet on hatchability.

Carnitine in poultry diet has been shown to have no effect on feed intake, body and abdominal fat weight or on carcass or liver lipid levels (Cartwright, *Poul Sci* 65(Suppl. 1) :21, 1986). Dietary carnitine has been shown to retard ethanol metabolism in broilers (Smith et al., *Poul Sci* 71 (Suppl. 1 ): 64, 1992). However, neither of these reports discuss an effect on the hatchability of the eggs laid by hen on such a diet.

Carnitine was found not suitable as a substitute for choline in the diet of quail (Chang et al., *Poul Sci* 94(5):1718–1720, 1975). In a control experiment of this study, carnitine was used as an additive to a standard diet containing choline. The added carnitine decreased the hatchability of the quail eggs. This observed decrease could be due to one or both of the following differences between this experiment and the present invention. Chang et al. used racemic carnitine (a mixture of both the D- and L- isomers), where L-carnitine is presently preferred. More importantly, the carnitine concentration was more than twice the upper concentration limit recommended by the present disclosure, i.e. 1400 mg/kg vs. about 675 mg/kg. As discussed below, the present inventors believe that there is an upper concentration limit for effectiveness.

Several patents have been issued which provide methods of increasing the hatchability of eggs. U.S. Pat. No. 2,734,482, issued to Seltzer involves distribution inside the egg of sex hormone, such as estrogens or androgens, through the wetting the outside of the egg shell with a liquid formulation of the hormone. Such treatment is said to improve the hatchability and viability of the resulting chicks. U.S. Pat. No. 4,604,968, issued to Christensen, discloses an increase in hatchability through the injection of eggs with a substance which increases the endogenous thyroid output of the developing embryo. U.S. Pat. No. 4,973,595, issued to Robel, discusses the increase in hatchability of turkey eggs by injecting pyridoxine at a particular developmental stage.

All of these patented methods involve treatment of the eggs themselves, and thus are labor intensive and would involve major alterations in handling of the laid eggs. Therefore, there remains a need in the art for a method of increasing hatchability of the eggs which can be easily incorporated into existing farming techniques.

Accordingly, one aspect of the present invention is a diet for breeder hens which comprises an effective amount of carnitine, where the desired effect is an increase in the hatching percentage of eggs laid by the hens.

A further aspect of the present invention is a method of improving hatchability of eggs which involves feeding hens a standard diet which has been supplemented with an effective amount of carnitine.

SUMMARY OF THE INVENTION

The goal for every broiler breeder stock in the United States is 12 dozen hatching eggs/hen housed in 36–40 weeks production. This computes into a final result of about 110–115 broiler chicks/breeder female housed. Table 1 documents a sample plan which achieves a performance goal in this range. As evident from the table, there are a number of variables which affect the attainment of these goals, including the percent of hens producing, the mortality of the hens, the number of eggs laid, and the percentage of the eggs which hatch.

TABLE 1

| | | | | Broiler Breeder Performance Goals | | | | | |
|---|---|---|---|---|---|---|---|---|---|
| Age, Weeks | Prod. % Hen Day | Mort. % | No. Hens End of Period | Fd/Doz.[1] lbs. | No. Eggs[2] Period | Hatch. Eggs, % | No. Hatch Eggs | Hatch % | No. Chicks/ Period |
| 5 | 5.0 | .20 | 998 | 77.82 | 349 | — | — | — | — |
| 6 | 18.5 | .20 | 996 | 22.38 | 1,290 | — | — | — | — |
| 7 | 37.5 | .25 | 994 | 11.04 | 2,609 | 55 | 1,435 | 65 | 938 |
| 8 | 55.0 | .25 | 991 | 7.53 | 3,815 | 62 | 2,365 | 75 | 1,774 |
| 9 | 72.0 | .25 | 989 | 5.75 | 4,985 | 70 | 3,490 | 82 | 2,862 |
| 0 | 79.0 | .25 | 986 | 5.24 | 5,453 | 80 | 4,362 | 87 | 3,795 |
| 1-34 | 78.0 | 1.00 | 976 | 5.31 | 21,316 | 87 | 18,545 | 86 | 15,919 |
| 5-38 | 74.0 | 1.00 | 966 | 5.59 | 20.016 | 92 | 18,414 | 85 | 15,652 |
| 9-42 | 70.0 | 1.00 | 956 | 5.91 | 18,738 | 97 | 18,176 | 84 | 15,268 |
| 3-46 | 66.0 | 1.00 | 946 | 6.27 | 17,482 | 97 | 16,958 | 83 | 14,075 |
| 7-50 | 61.5 | 1.00 | 936 | 6.73 | 16,118 | 97 | 14,534 | 82 | 12,820 |
| 1-54 | 57.5 | 1.00 | 926 | 7.20 | 14,909 | 97 | 14,462 | 80 | 11,570 |
| 5-58 | 53.0 | 1.00 | 916 | 7.81 | 13,593 | 97 | 13,185 | 78 | 10,284 |
| 9-62 | 48.5 | 1.00 | 906 | 8.54 | 12,303 | 97 | 11,934 | 76 | 9,070 |
| Average | 60.3 | 9.40 | | 6.86 | 152,976 | 97 | 138,960 | 82 | 114,052 |

TABLE 1-continued

| | | | Broiler Breeder Performance Goals | | | | | |
|---|---|---|---|---|---|---|---|---|
| Age, Weeks | Prod. % Hen Day | Mort. % | No. Hens End of Period | Fd/Doz.[1] lbs. | No. Eggs[2] Period | Hatch. Eggs, % | No. Hatch Eggs | Hatch % | No. Chicks/ Period |
| Total | | | | | | | | |

[1] Based on a feeding rate of 32 pounds/bird or .345 lbs./hen/day with 7 males/100 females.
[2] Based on 1000 hens at 24 weeks.

Increasing hatchability, that is, increasing the percentage of laid eggs which hatch, is particularly desirable, as even a small increase in percentage will significantly affect the resulting chick numbers. Therefore, increased hatchability is considered an important factor in large scale breeding programs.

The present inventors have surprisingly discovered that supplementing standard broiler breeder diets with carnitine results in a significant increase in hatchability of eggs laid by the hens. This improvement results in greater chick numbers, thus allowing production goals to be reached or exceeded. The increase in hatchability is concentration dependent, with both lower and upper concentration limitations.

Without being bound by theory, it is believed that a breeder hen diet supplemented by carnitine results in an increase in carnitine concentration in the egg. As carnitine is well known for its ability to increase fat utilization, it is theorized that the increased concentration in the egg allows the embryo to more easily employ the stored fat of the egg, thus increasing the chances of survival for the embryo.

DETAILED DESCRIPTION OF THE INVENTION

All patent applications, patents, and literature references cited in this specification are hereby incorporated by reference in their entirety.

The present invention relates to a diet for breeder hens which comprises carnitine. The carnitine is present in concentrations which make the diet suitable for use in the method of the present invention. The present method increases the hatchability of eggs laid by hens fed the diet of the present invention.

Suitable poultry to be fed the diet of the present invention include but is not limited to the female breeder hens of chickens, turkeys, ducks, pigeons, quail, or any other poultry species which has female breeders.

The supplemental carnitine can be any isomer of carnitine, preferably L-carnitine. Also suitable for formulation of the diet of the present invention are salts of carnitine, such as acetyl carnitine. The carnitine is present in an effective amount, where the desired effect is an increase in the hatchability of eggs laid by hens fed the diet. This increase can be of any level above the hatchability of eggs of hens fed the diet without the carnitine supplement, as even very small differences in hatchability have significant effect on the number of chicks produced. This is due to the large number of eggs produced in a production season.

Experiments by the present inventors indicate that not only is there a minimum amount of carnitine which can be considered effective, but that large concentrations of carnitine also reduce the hatchability seen, although the percent hatching observed is still above the levels seen with eggs from the control hens. However, given the detailed guidance of the present specification, it is believed within the level of one of ordinary skill to test a range of carnitine concentrations using a trial feed in order to optimize the concentration for the particular species and breed being fed. Generally, effective concentrations will range between about 5 and about 500 ppm of the feed. For boiler breeder hens, particularly the Hybro strain Euribrid, concentrations of carnitine between about 20 and about 100 parts ppm of the feed have been shown effective, with the preferred concentration being about 50 ppm.

The base diet of the present invention can be any typical poultry diet known in the art, as well as those used to control body weight such as "low" protein formulations, "low" energy formulations or lysine deficient rations. Generally, a typical diet will include a selection of the ingredients described below. The final formulation, prior to carnitine addition, will generally contain about 12–25% crude protein, about 0.5–10% crude fat, and about 2–12% crude fiber.

The primary component is generally grain and processed grain by products, such as corn, corn hominy, corn germ meal, barley millet, oats, rice, rice hulls, rye, sorghum, wheat and wheat shorts. These are considered "energy" ingredients, supplying carbohydrates with some protein.

The feed can also include plant protein products, such as soybean oil meal, alfalfa meal, barley malt sprouts, coconut meal, corn distillers grain, corn gluten meal, cottonseed meal, pea seed, potato meal, peanut meal, sunflower meal, wheat germ meal, and brewers' yeast. These are considered "protein" ingredients, supplying protein to the diet.

Feeds generally contain animal and fish by-products such as blood meal, blood flour, dried buttermilk, dried whey, dried casein, fish meal, dried fish solubles, liver meal, meat meal, meat meal tankage, bone meal and dried skim milk. Anchovies, herring and menhaden are well-known sources of fish meal.

The feed is often supplemented with minerals and synthetic trace ingredients. Vitamins often used include B-12, A, pantothenate, niacin, riboflavin, K, folic acid, etc. Amino acids such as DL-methionine are often added, as well as trace minerals including choline chloride, dicalcium phosphate, magnesium sulfate, potassium sulfate, calcium carbonate (limestone, oyster shells), salt, sodium selenite, manganous oxide, calcium iodate, copper oxide, zinc oxide, and D-activated animal sterol.

Molasses and animal fats are added to improve palatability and to increase or balance energy levels.

The feed can also contain preservatives such as ETHOXYQUIN ® and sodium sulfite.

The feed schedule and feed rates can also be any standard schedule and rate used in the art, including feed restrictive programs.

The following example is representative of the present invention but is not to be considered limiting to the scope of the invention.

EXAMPLE

A total of 5400 commercial hens, Hybro strain Euribrid, were divided into groups of 1350 birds each and fed diet compositions containing various levels of L-carnitine. Table 2 documents the nutrient composition of the diets, as well as the analyzed L-carnitine levels.

TABLE 2

| Nutrient composition in % | Control | 20 ppm | 50 ppm | 100 ppm |
| --- | --- | --- | --- | --- |
| dry matter | 89.94 | 89.87 | 90.37 | 90.07 |
| ash | 9.83 | 11.35 | 10.73 | 10.56 |
| crude protein | 17.71 | 17.89 | 17.89 | 18.02 |
| crude fat | 5.7 | 5.8 | 8.06 | 6.06 |
| crude fibre | 2.89 | 2.87 | 3.04 | 3.06 |
| N-free extract | 53.91 | 52.06 | 52.88 | 52.35 |
| L-carnitine (analyzed) mg/kg | 13 | 29 | 86 | 135 |

The hens were maintained on this diet for thirty days, during which the hatchability, as measured by a percentage of incubated eggs, was determined. Table 3 summarizes the results for each of the 4 diets tested.

TABLE 3

| Group | Hatchability as a percentage of incubated eggs | | | | hatchability day 29-35 control - 100 |
| --- | --- | --- | --- | --- | --- |
| | day 1-7 | day 8-14 | day 15-21 | day 22-28 | |
| control | 81.3 | 79.6 | 84.4 | 81.76 | 100 |
| 20 ppm | 78.2 | 82.00 | 85.95 | 85.90 | 105.1 |
| 50 ppm | 83.00 | 81.10 | 87.00 | 87.00 | 106.4 |
| 100 ppm | 82.40 | 81.00 | 88.50 | 84.30 | 103.1 |

The above results suggest the use of carnitine in poultry feed to increase hatchability of eggs laid by hens fed with the feed. Specifically suggested is the use of L-carnitine, in the concentration range of 20 to 100 ppm, with the preferred concentration being 50 ppm. The above results also suggest that as carnitine concentration increases above 50 ppm, the effect on hatchability may be reduced. Extrapolation from this data indicates that there is an upper limit in carnitine concentrations which are effective in increasing egg hatchability.

Having described this invention and its benefits in detail above, it will be apparent that a skilled practitioner can make modifications and changes of the invention as above-described without departing from the scope or spirit of the claims which follow.

What is claimed is:

1. A method for increasing the hatchability of eggs laid by a breeder hen, the method comprising providing to the hen a diet which comprises an effective amount of carnitine.

2. The method of claim 1 wherein the carnitine is selected from the group consisting of L-carnitine, D-carnitine, DL-carnitine, and salts thereof.

3. The method of claim 1 wherein the carnitine is L-carnitine.

4. The method of claim 1 wherein the effective amount of carnitine is from about 5 ppm to about 500 ppm of the feed.

5. The method of claim 1 wherein the effective amount of carnitine is about 50 ppm of the feed.

* * * * *